United States Patent
Mohan et al.

(10) Patent No.: US 9,900,966 B2
(45) Date of Patent: Feb. 20, 2018

(54) OPERATION OF A STANDALONE SENSOR DEVICE

(71) Applicant: enLighted, Inc., Sunnyvale, CA (US)

(72) Inventors: Tanuj Mohan, Mountain View, CA (US); Omkar Prabhu, Santa Clara, CA (US); Venkatesh Srinivasan, Thousand Oaks, CA (US)

(73) Assignee: enLighted, Inc., Sunnyvale, CA (US)

( * ) Notice: Subject to any disclaimer, the term of this patent is extended or adjusted under 35 U.S.C. 154(b) by 56 days.

(21) Appl. No.: 15/186,434

(22) Filed: Jun. 18, 2016

(65) Prior Publication Data

US 2016/0295671 A1    Oct. 6, 2016

Related U.S. Application Data

(60) Division of application No. 14/468,465, filed on Aug. 26, 2014, now Pat. No. 9,474,135, which is a
(Continued)

(51) Int. Cl.
| | |
|---|---|
| G06M 7/00 | (2006.01) |
| H05B 37/02 | (2006.01) |
| G04R 20/00 | (2013.01) |
| G05D 23/19 | (2006.01) |
| G08B 13/189 | (2006.01) |
| G08B 13/19 | (2006.01) |
| G08B 17/12 | (2006.01) |
| G08B 19/00 | (2006.01) |
| G01J 1/02 | (2006.01) |

(Continued)

(52) U.S. Cl.
CPC ........ *H05B 37/0272* (2013.01); *G01J 1/0219* (2013.01); *G01J 1/4228* (2013.01); *G04R 20/00* (2013.01); *G04R 20/08* (2013.01); *G05D 23/19* (2013.01); *G08B 13/1895* (2013.01); *G08B 13/19* (2013.01); *G08B 17/12* (2013.01); *G08B 19/005* (2013.01); *H05B 37/0218* (2013.01); *H05B 37/0227* (2013.01); *H05B 37/0245* (2013.01); *G01J 1/0228* (2013.01); *G01J 2001/4238* (2013.01); *Y02B 20/44* (2013.01); *Y02B 20/46* (2013.01)

(58) Field of Classification Search
CPC   G04R 20/08; H05B 37/0218; H05B 37/0227; Y02B 20/44
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |

(Continued)

*Primary Examiner* — Thanh Luu
(74) *Attorney, Agent, or Firm* — Brian R. Short (57) ABSTRACT

Apparatuses, methods, apparatuses and systems for standalone sensor unit are disclosed. For an embodiment, the standalone sensor unit includes a plurality of sensors and a controller. The controller is operative to detect a presence of a mobile unit, wherein detecting the presence of the mobile unit comprises the controller being operative to sense motion with a motion sensor, and sense a strobe of light, wherein the sensed motion and the sensed strobe of light occur within a predetermined time of each other, and receive a configuration setting from the mobile unit within a window of time after presence of the mobile unit has been detected.

17 Claims, 6 Drawing Sheets

Related U.S. Application Data continuation-in-part of application No. 13/466,483, filed on May 8, 2012, now Pat. No. 9,148,935, which is a continuation-in-part of application No. 13/304,503, filed on Nov. 25, 2011, now Pat. No. 8,558,466.

(60) Provisional application No. 61/872,647, filed on Aug. 31, 2013.

(51) Int. Cl.
    *G01J 1/42*      (2006.01)
    *G04R 20/08*      (2013.01)

(56) References Cited

U.S. PATENT DOCUMENTS

| | | | |
|---|---|---|---|
| 5,191,265 | A | 3/1993 | D'Aleo et al. |
| 5,283,516 | A | 2/1994 | Lohoff |
| 5,812,422 | A | 9/1998 | Lyons |
| 6,057,654 | A | 5/2000 | Cousy et al. |
| 6,188,181 | B1 | 2/2001 | Sinha et al. |
| 6,342,994 | B1 | 1/2002 | Cousy et al. |
| 6,548,967 | B1 | 4/2003 | Dowling et al. |
| 7,309,985 | B2 | 12/2007 | Eggers et al. |
| 7,348,736 | B2 | 3/2008 | Piepgras et al. |
| 7,437,596 | B2 | 10/2008 | McFarland |
| 7,382,271 | B2 | 12/2008 | McFarland |
| 7,550,931 | B2 | 6/2009 | Lys et al. |
| 7,566,137 | B2 | 7/2009 | Veskovic |
| 7,623,042 | B2 | 11/2009 | Huizenga |
| 7,792,956 | B2 | 9/2010 | Choong et al. |
| 7,925,384 | B2 | 4/2011 | Huizenga et al. |
| 2004/0002792 | A1 | 10/2004 | Hoffknecht |
| 2005/0169643 | A1 | 8/2005 | Franklin et al. |
| 2005/0278047 | A1 | 12/2005 | Ahmed |
| 2006/0275040 | A1 | 12/2006 | Franklin |
| 2007/0057807 | A1 | 3/2007 | Walters et al. |
| 2007/0061050 | A1 | 3/2007 | Hoffknecht |
| 2007/0086128 | A1 | 4/2007 | Lane et al. |
| 2007/0215794 | A1 | 9/2007 | Cernasov et al. |
| 2008/0185597 | A1 | 8/2008 | Veskovic et al. |
| 2008/0244104 | A1 | 10/2008 | Clemente |
| 2008/0265796 | A1 | 10/2008 | Null |
| 2009/0026966 | A1 | 1/2009 | Budde et al. |
| 2009/0179596 | A1 | 7/2009 | Willaert et al. |
| 2009/0195161 | A1 | 8/2009 | Lane et al. |
| 2010/0034386 | A1 | 2/2010 | Choong et al. |
| 2010/0135186 | A1 | 6/2010 | Choong et al. |
| 2010/0264846 | A1 | 10/2010 | Chemal et al. |
| 2010/0270933 | A1 | 10/2010 | Chemal et al. |
| 2010/0295482 | A1 | 11/2010 | Chemal et al. |
| 2010/0301777 | A1 | 12/2010 | Chemal et al. |
| 2011/0031897 | A1 | 2/2011 | Henig et al. |
| 2011/0121654 | A1* | 5/2011 | Recker .............. H02J 9/065 307/66 |
| 2011/0199010 | A1 | 8/2011 | Henig et al. |

\* cited by examiner

FIGURE 1

Detecting, by a standalone sensor unit, a presence of a mobile unit comprising sensing motion and sensing a strobe of light, wherein the sensed motion and the sensed strobe of light occur within a predetermined time of each other
210

Receiving, by the standalone sensor unit, a configuration setting from the mobile unit within a window of time after presence of the mobile unit has been detected
220

OPERATION OF A STANDALONE SENSOR DEVICE

RELATED APPLICATION

This patent application is a divisional patent application of U.S. patent application Ser. No. 14/468,465, filed on Aug. 26, 2014, which claims priority to U.S. provisional patent application Ser. No. 61/872,647, filed on Aug. 31, 2013, and is a continuation-in-part (CIP) of U.S. patent application Ser. No. 13/466,483, filed on May 8, 2012, which is a continuation-in-part (CIP) of U.S. Pat. No. 8,558,466 which was filed on Nov. 25, 2011 and granted on Oct. 15, 2013, all of which are herein incorporated by reference.

FIELD OF THE EMBODIMENTS

The described embodiments relate generally to environment control of a structure. More particularly, the described embodiments relate to operation of a standalone sensor that aids environmental control of the structure.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

Centrally controlled lighting systems can be disadvantageous because all decision making occurs at the controller. Therefore, if the controller becomes inoperative, all lighting devices in the system are no longer under automated control and some or all may not operate even manually. Similarly, if a connection to or from the controller is severed, the lighting devices served by that connection are no longer under automated control and also may not operate manually. Partial or system-wide functional changes, such as an immediate need to override current system settings (for example, during a fire or other emergency), cannot be made from anywhere but the controller. Additionally, centrally-controlled systems are limited in their ability to be scaled. That is, it is not easy to add new lighting devices to a centrally-controlled system.

Decentralized lighting systems address many of the above-described issues. However, decentralized lighting systems require commissioning of lighting devices associated with the lighting systems.

It is desirable to have a method, system and apparatus for standalone environmental (such as, lighting) sensor unit for aiding environment control of a structure, wherein a user can configure the standalone sensor unit.

SUMMARY

One embodiment includes a standalone sensor unit. The standalone sensor unit includes a plurality of sensors and a controller. The controller is operative to detect a presence of a mobile unit, wherein detecting the presence of the mobile unit comprises the controller being operative to sense motion with a motion sensor, and sense a strobe of light, wherein the sensed motion and the sensed strobe of light occur within a predetermined time of each other, and receive a configuration setting from the mobile unit within a window of time after presence of the mobile unit has been detected.

Another embodiment includes a method. The method includes detecting, by a standalone sensor unit, a presence of a mobile unit comprising sensing motion and sensing a strobe of light, wherein the sensed motion and the sensed strobe of light occur within a predetermined time of each other, and receiving, by the standalone sensor unit, a configuration setting from the mobile unit within a window of time after presence of the mobile unit has been detected.

Other aspects and advantages of the described embodiments will become apparent from the following detailed description, taken in conjunction with the accompanying drawings, illustrating by way of example the principles of the described embodiments.

DETAILED DESCRIPTION

As shown in the drawings, the described embodiments are embodied in an apparatus and method of a standalone sensor unit.

Figure 1:
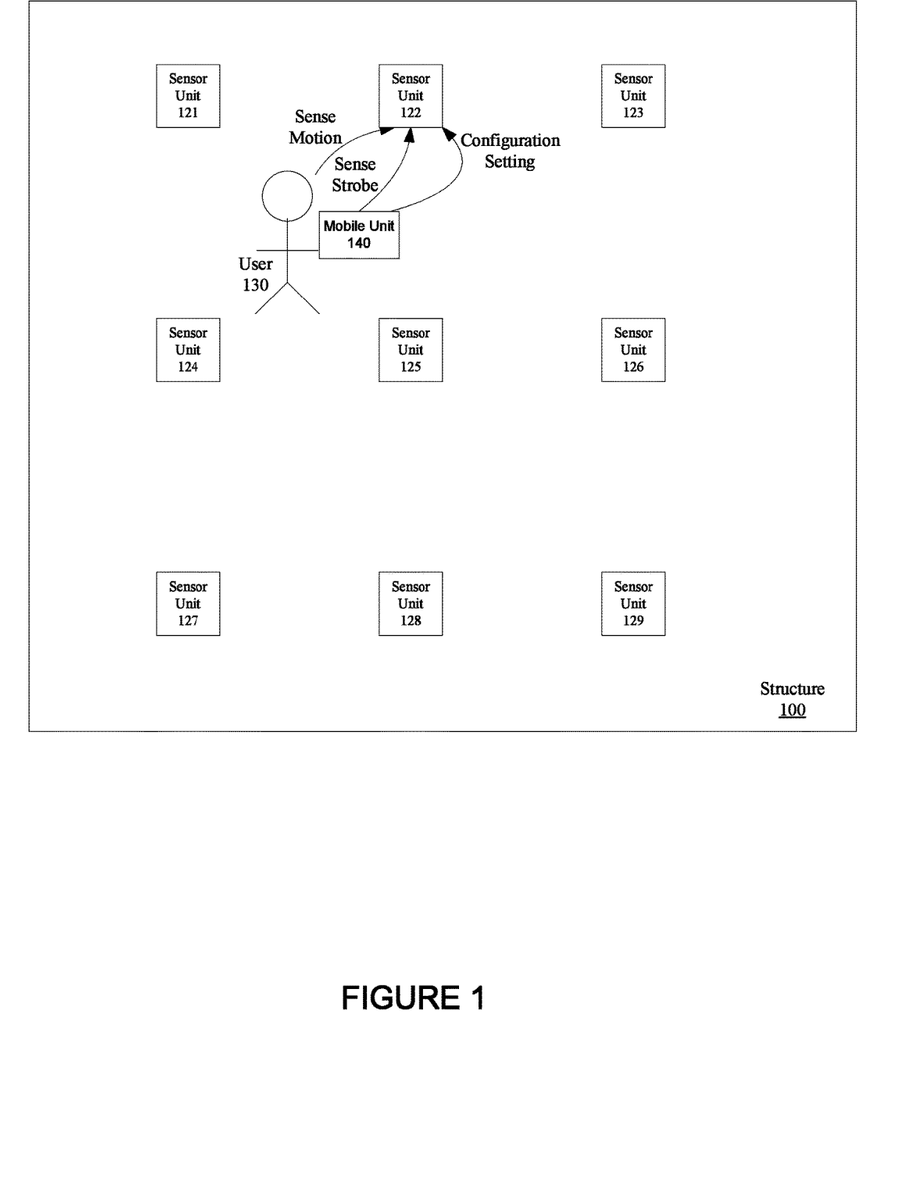
FIG. 1 shows a user device operative to bind to standalone sensor units, and further operative to upload configuration settings to the standalone sensor units, according to an embodiment.

FIG. 1 shows a user device (mobile unit 140) operative to bind to standalone sensor units, and further operative to upload configuration settings to the standalone sensor units, according to an embodiment. As shown, a structure 100 includes multiple standalone sensor units 121-129. A user 130 operating the mobile unit 140 travels about the structure 100. For at least some embodiments, the mobile unit 140 is operative to bind with one or more of the standalone sensor units 121-129.

For at least some embodiment, each sensor unit includes a plurality of sensors, and a controller. For at least some embodiments, the controller is operative to detect a presence of the mobile unit 140, wherein detecting the presence of the mobile unit 140 includes the controller being operative to sense motion with a motion sensor, and sense a strobe of light, wherein the sensed motion and the sensed strobe of light occur within a predetermined time of each other. That is, the sensor unit binds to the mobile unit 140 when the sensor unit senses motion (that is, of the user 130 and the mobile unit 140) and sensor unit senses a strobe of light generated by the mobile unit 140 within a predetermined time of each other. By combining the sensed motion and the sensed strobe of light, the likelihood of the sensor unit generating a false positive in the process of binding with the mobile unit 140 is low.

For at least some embodiments, sensing motion includes detecting an event. For an embodiment, the event includes a sequence of sensed motion. That is, sensing motion include sensing specific types of motion.

For at least some embodiments, sensing a strobe of light includes sensing a sequence of strobes of light. That is, the sequence can include a coded sequence, wherein the strobe of light includes a series of light pulses of a predetermined sequence, wherein each pulse can include a selected width or duration of time. For an embodiment, the sequence further includes colors of light. That is, for example, the sequence of strobes of light includes sequences of colors, such as, red, blue and green. The sequences can include any number of pulsed strobes of light wherein each strobe includes a predetermined color. Any sequence of colors of strobes of light can be selected for the sensing of the strobe of light.

As previously stated, for an embodiment, the sensor unit binds to the mobile unit when the sensor unit senses motion (that is, of the user 130 and the mobile unit 140) and senses a strobe of light generated by the mobile unit 140 within a predetermined time of each other. For at least some embodiments, the predetermined time is selected based upon typical movement of the mobile unit 140 (and the user of the mobile unit 140).

For an embodiment, the sensor unit sensing motion includes motion in general. For another embodiment, the sensor unit sensing motion includes the controller of the sensor unit tracking sensed motion (or sequences of motion) over a selection motion period of time. For an embodiment, the sensing motion includes generating a motion signature over a period of time, and identifying the motion by matching the motion signature with known motion signatures.

Further, motion identification can be performed after binding the sensor unit to the mobile unit 140. The motion identification after binding allows the sensor unit to identify motion events of the user 130 through event detection of the mobile unit 140.

Further, once binding with the mobile unit 140 has been established, at least some embodiments further include the controller of the sensor unit 122 being operative to receive a configuration setting from the mobile unit. For an embodiment, the configuration setting must be received within a window of time after presence of the mobile unit has been detected. For at least some embodiments, the binding between the sensor unit 122 and the mobile unit 140 prevents other mobile units (at least mobile units that have not been bound to the sensor unit 122) from being able to upload configuration settings.

For at least some embodiments, a wireless link is established between the mobile unit 140 and the one or more of standalone sensor units 121-129. The wireless link provides a communication path between the mobile unit 140 and the one or more of standalone sensor units 121-129, wherein the configuration settings can be uploaded from the mobile unit to the one or more of standalone sensor units 121-129 through this communication path. As previously stated, for an embodiment, the configuration setting must be received within a window of time after the presence of the mobile unit 140 has been detected. For an embodiment, this is achieved by establishing the wireless link during the window of time after the presence of the mobile unit 140 has been detected. By only establishing the wireless link during the window of time, security between the mobile unit 140 and the sensor unit 122 is enhanced. That is, the wireless link and the communication path are established for only during the window of time after the presence of the mobile unit 140 has been detected.

Figure 2:
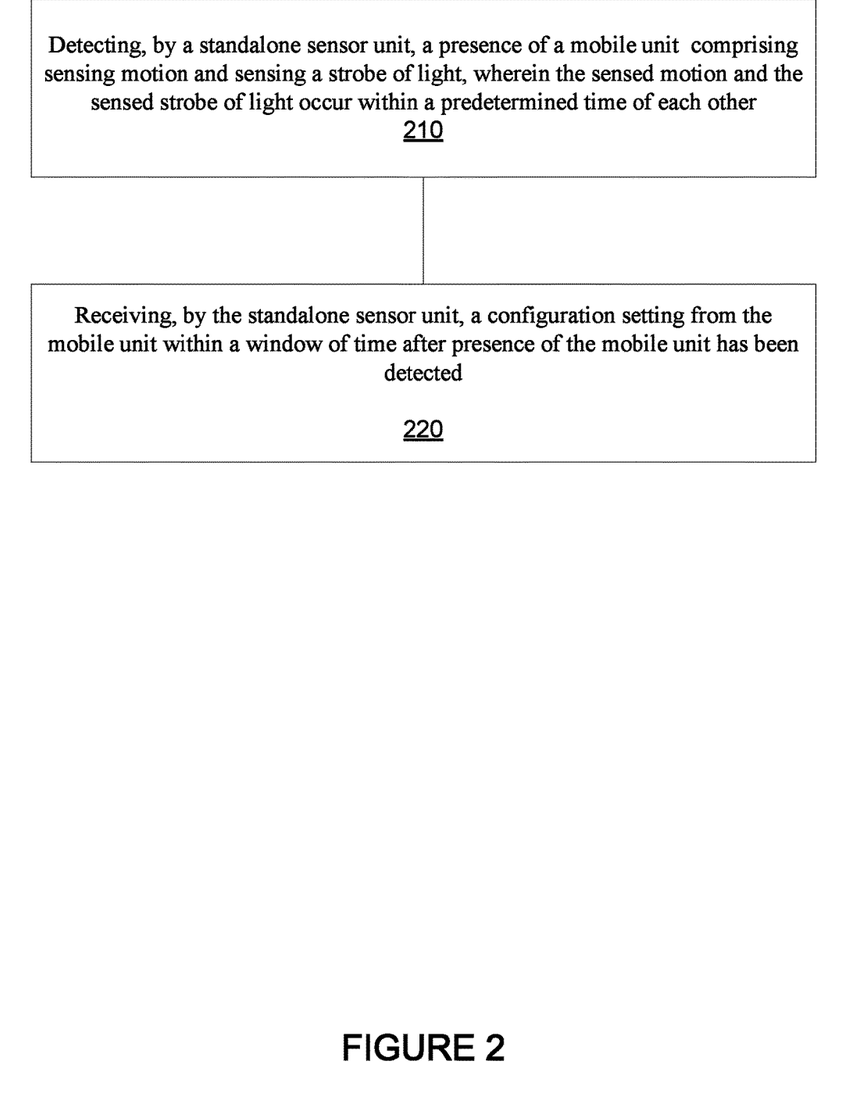
FIG. 2 is a flow chart that includes steps of a binding a user device to standalone unit, according to an embodiment.

FIG. 2 is a flow chart that includes steps of a binding a user device to standalone unit, according to an embodiment. A first step 210 includes detecting, by a standalone sensor unit, a presence of a mobile unit including sensing motion and sensing a strobe of light, wherein the sensed motion and the sensed strobe of light occur within a predetermined time of each other. A second step 220 includes receiving, by the standalone sensor unit, a configuration setting from the mobile unit after presence of the mobile unit has been detected.

An embodiment further includes the standalone sensor unit initiating transmission of beacons after the binding between the mobile unit and the standalone sensor unit has occurred, wherein the beacons include information about the standalone sensor unit. For an embodiment, the mobile unit utilizes the information about the standalone sensor unit to determine a location of the mobile unit. For an embodiment, the information about the standalone sensor unit includes location information about the standalone sensor unit. If the transmission power of the beacons is less than a predetermined transmit power amount, the mobile unit is only able to receive the transmitted beacons within a threshold distance. Therefore, for an embodiment, the location of the mobile unit is approximated based on a known location of the standalone sensor unit, wherein the known location can be included within the beacons. The location of the standalone sensor unit can be provided at the time of deployment of the standalone sensor unit.

For another embodiment, beacons from multiple standalone sensor units are received by the mobile unit which can be used through triangulation for further estimate the location of the mobile unit. That is, based on a received signal strength of the received beacons, the distance the mobile unit is from each of the standalone sensor units can be approximated. Further, a more-precise estimation of the location of the mobile unit can be estimated by triangulating the estimated distance from each of the standalone sensor units.

A least some embodiment include a timing calibration. Specifically, an embodiment includes a method of time calibrating the standalone sensor unit, including receiving, by a long-wave radio of the standalone sensor unit, an atomic clock signal. Further, the time is determined based on the received atomic clock signal, and selecting a standalone unit profile based on the time. For an embodiment, the atomic clock signal includes signals received from WWVB. WWVB (designator for standard time and frequency station) is a NIST (National Institute of Standards and Technology) time signal radio station near Fort Collins, Colo., co-located with WWV. WWVB is the station that radio-controlled clocks in most of North America use to synchronize themselves. The 70 kW ERP (effective radiated power) signal transmitted from WWVB is a continuous 60 kHz carrier wave, the frequency of which is derived from a set of atomic clocks located at the transmitter site, yielding a frequency uncertainty of less than 1 part in $10^{12}$. A one-bit-per-second time code, which is based on the TRIG "H" time code format and derived from the same set of atomic clocks, is then modulated onto the carrier wave using pulse width modulation and amplitude-shift keying. A single complete frame of time code begins at the start of each minute, lasts one minute, and conveys the year, day of year, hour, minute, and other information as of the beginning of the minute.

While most time signals encode the local time of the broadcasting nation, the United States spans multiple time zones, so WWVB broadcasts the time in Coordinated Universal Time (UTC). Radio-controlled clocks can then apply time zone and daylight saving time offsets as needed to display local time.

At least some embodiment of the standalone sensor unit further include sensing ambient light, and selecting a time zone based on timing of the sensed ambient light. Further, for at least some embodiments selecting the time zone includes accessing a look up table based on the time and the timing of the sensed ambient light. That is, the atomic clock signal allows the standalone sensor unit to determine the time at the source of the atomic clock signal. However, the standalone sensor unit may be located in a different time zone as the source of the atomic clock signal. Accordingly, the standalone sensor unit may incorrectly set the profile of the standalone sensor unit. However, if the standalone sensor unit further includes an ambient sensor, a sensed signal of the ambient sensor can be used to roughly approximate the time. This sensed signal along with the determined time of the source of the atomic clock signal, allows the standalone sensor unit to more accurately estimate the time where the standalone sensor unit is located, and therefore, more accurately control the profile settings of the standalone sensor unit. For an embodiment, the selected standalone sensor unit profile includes operating controls of the standalone sensor unit.

Binding Between the Mobile Unit and the Stand-Alone Sensor

For at least some embodiments, detecting the presence of the mobile unit binds the stand-alone sensor unit to the mobile unit. That is, once the stand-alone sensor unit and the mobile unit are binded, the communication between them is secure. That is, other mobile units cannot provide control signals to the stand-alone sensor unit without being bound to the stand-alone sensor unit. For an embodiment, the binding includes source-MAC binding and shared key binding. For an embodiment, the source-MAC binding authorizes the mobile unit to send configuration or override commands to the sensor unit.

For at least some embodiments, receiving the configuration comprises an operator of the mobile unit selecting the configuration setting from a plurality of predetermined configuration settings.

For at least some embodiments, the configurations vary over time. For example, different timing behaviors or configurations can be selected for lighting control that is influenced by the stand-alone sensor. For example, motion sensing can be used to control the activation of lighting, or to control the intensity of lighting. For an embodiment, at a first time the configuration includes a first lighting control, and at a second time the configuration includes a second lighting control. For example, in the middle of the day, the configuration can be set to turn off lighting. Further, in the middle of the night the configuration can be set to adjust lighting to some percentage of full on lighting. Further, the lighting can be both time and location dependent. For example, lighting control of a first location (for example, the northern hemisphere) can be different than lighting control of a second location (for example, the southern hemisphere).

For at least some embodiments, selecting at least one of the predetermined configuration setting enables the sensor unit to connect to a network.

Figure 3:
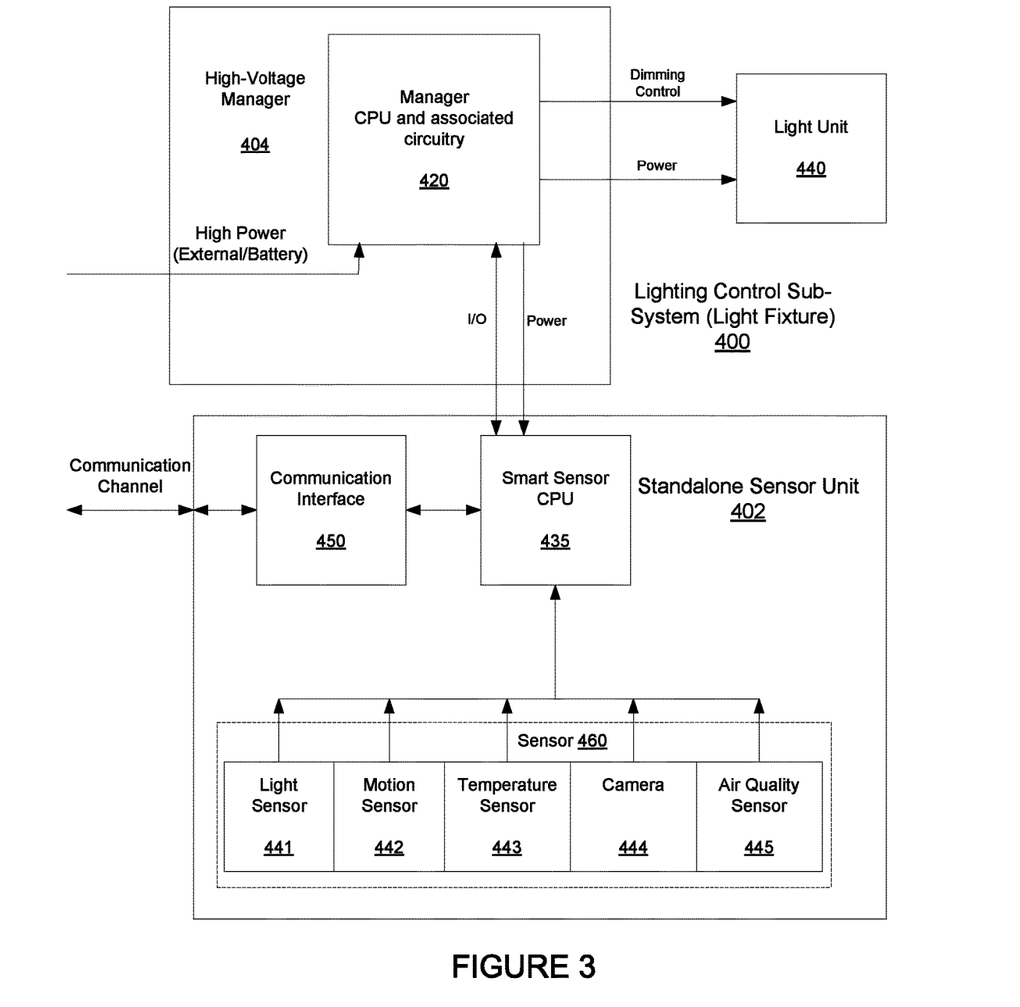
FIG. 3 shows a standalone sensor unit, according to an embodiment.

FIG. 3 shows a lighting control sub-system (light fixture) that includes a standalone sensor unit that includes time estimation, according to an embodiment. The exemplary light fixture 400 (which could alternatively by referred to as lighting control subsystem because of the multiple controls) includes a standalone sensor unit 402 that is interfaced with a high-voltage manager 404, which is interfaced with a luminaire 440. The high-voltage manager 404 includes a controller (manager CPU) 420 that is coupled to the luminaire 440, and to a smart sensor CPU 435 of the standalone sensor unit 402. As shown, the smart sensor CPU 435 is coupled to a communication interface 450, wherein the communication interface 450 couples the controller 435 to an external device. The standalone sensor unit 402 additionally includes a sensor 460. As indicated, the sensor 460 can include one or more of a light sensor 441, a motion sensor 442, temperature sensor 443, a camera 444 and/or an air quality sensor 445. It is to be understood that this is not an exhaustive list of sensors. That is additional or alternate sensors can be utilized for lighting and/or environmental control of a structure that utilizes the lighting control subsystem 400. The sensor 460 is coupled to the smart sensor CPU 435, and the sensor 460 generates a sensed input. For at least one embodiment, at least one of the sensors is utilized for communication with the user device.

For at least some embodiments, the smart sensor CPU (controller) 435 is operative to detect a presence of a mobile unit, wherein detecting the presence of the mobile unit comprises the controller being operative to sense motion with the motion sensor 442, and sense (through, for example, the light sensor 441) a strobe of light, wherein the sensed motion and the sensed strobe of light occur within a predetermined time of each other. Further, the smart sensor CPU 435 is operative to receive a configuration setting from the mobile unit within a window of time after presence of the mobile unit has been detected.

For at least some embodiments, receiving the configuration setting comprises an operator of the mobile unit selecting the configuration setting from a plurality of predetermined configuration settings. For at least some embodiments, at least one of the predetermined configuration settings enables the sensor unit to connect to a network. For an embodiment, connecting with the network occurs in the future relative to the when the configuration setting is received.

According to at least some embodiments, the controllers (manager CPU 420 and the smart sensor CPU 435) are operative to control a light output of the luminaire 440 based at least in part on the sensed input, and communicate at least one of state or sensed information to the external device.

For at least some embodiments, the high-voltage manager 404 receives the high-power voltage and generates power control for the luminaire 440, and generates a low-voltage supply for the standalone sensor unit 402. As suggested, the high-voltage manager 404 and the standalone sensor unit 402 interact to control a light output of the luminaire 440 based at least in part on the sensed input, and communicate at least one of state or sensed information to the external device. The high-voltage manager 404 and the standalone sensor unit 402 can also receive state or control information from the external device, which can influence the control of the light output of the luminaire 440. While the manager CPU 420 of the high-voltage manager 404 and the smart sensor CPU 435 of the standalone sensor unit 402 are shown as separate controllers, it is to be understood that for at least some embodiments the two separate controllers (CPUs) 420, 435 can be implemented as single controller or CPU.

For at least some embodiments, the communication interface 450 provides a wireless link to external devices (for example, the central controller, the user device and/or other lighting sub-systems or devices).

An embodiment of the high-voltage manager 404 of the lighting control sub-system 400 further includes an energy meter (also referred to as a power monitoring unit), which receives the electrical power of the lighting control sub-system 400. The energy meter measures and monitors the power being dissipated by the lighting control sub-system 400. For at least some embodiments, the monitoring of the dissipated power provides for precise monitoring of the dissipated power. Therefore, if the manager CPU 420 receives a demand response (typically, a request from a power company that is received during periods of high power demands) from, for example, a power company, the manager CPU 420 can determine how well the lighting control sub-system 400 is responding to the received demand response. Additionally, or alternatively, the manager CPU 420 can provide indications of how much energy (power) is being used, or saved.

Figure 4:
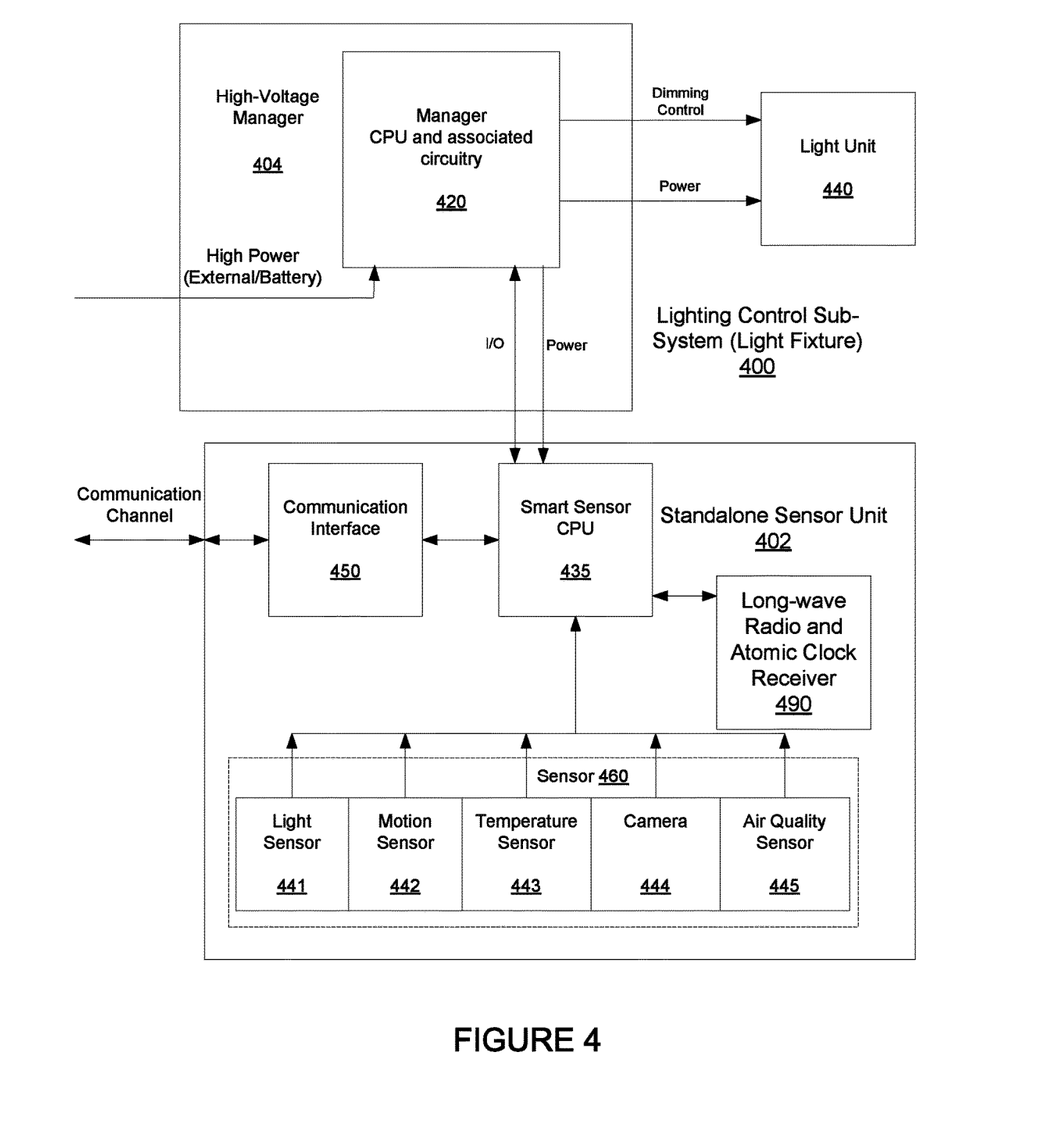
FIG. 4 shows a standalone sensor unit that includes time estimation, according to an embodiment.

FIG. 4 shows a standalone sensor unit that includes time estimation, according to an embodiment. This embodiment of the standalone sensor unit further includes a long-wave radio and atomic clock receiver 490.

For at least some embodiments, the long-wave radio is operative to receive an atomic clock signal. Further, the atomic clock receiver is operative to set a time based on the received atomic clock signal. Further, the controller is further operative to select a profile based on the time. That is, as previously described, for an embodiment, at a first time the configuration includes a first lighting control, and at a second time the configuration includes a second lighting control. For example, in the middle of the day, the configuration can be set to turn off lighting. Further, in the middle of the night the configuration can be set to adjust lighting to some percentage of full on lighting. Further, the lighting can be both time and location dependent. For example, lighting control of a first location (for example, the northern hemisphere) can be different than lighting control of a second location (for example, the southern hemisphere).

For at least some embodiments, an ambient light sensor (for example, light sensor 441) is operative to sense ambient light. Further, the controller is further operative to select a time zone based on timing of the sensed ambient light. For at least some embodiments, selecting the time zone comprises accessing a look up table based on the time and the timing of the sensed ambient light.

Event Identification

At least some of the described embodiments provide for identification of events through motion sensing or detection. For at least some embodiments, the identification of an event is utilized for detecting the presence of the mobile unit with a motion sensor. At least some embodiments include identifying events within a room, building or structure that can be used for identifying, for example, activities of person(s) or occupants, which can be used to provide intelligent lighting control of the room, building or structure. Additionally, or alternatively, the identified events can be used to control security, and/or other environmental aspects, for example heating/cooling, of the room, building or structure.

At least some embodiments additionally identify one or more sequences of events. For example, a person entering a structure and then leaving the structure includes a sequence of identifiable events. Also, for example, a person entering a structure and then remaining near-motionless within the structure includes a sequence of identifiable events. A lighting control system can intelligently utilize the identification of these sequences of events to control lighting within the structure. The term structure can be loosely interpreted as any area that can be intelligently controlled, such as, a building, a room, a parking structure, a parking lot, etc. Generally, the more knowledge and information a controller has about the environmental conditions of the structure, the more intelligently the controller can control the environmental conditions. While most of the described embodiments may be associated with lighting and intelligent lighting systems, it is to be understood that the embodiments can be adapted to control other types of environmental conditions of a structure, such as, heating, cooling, and adapted to security systems.

Figure 5:
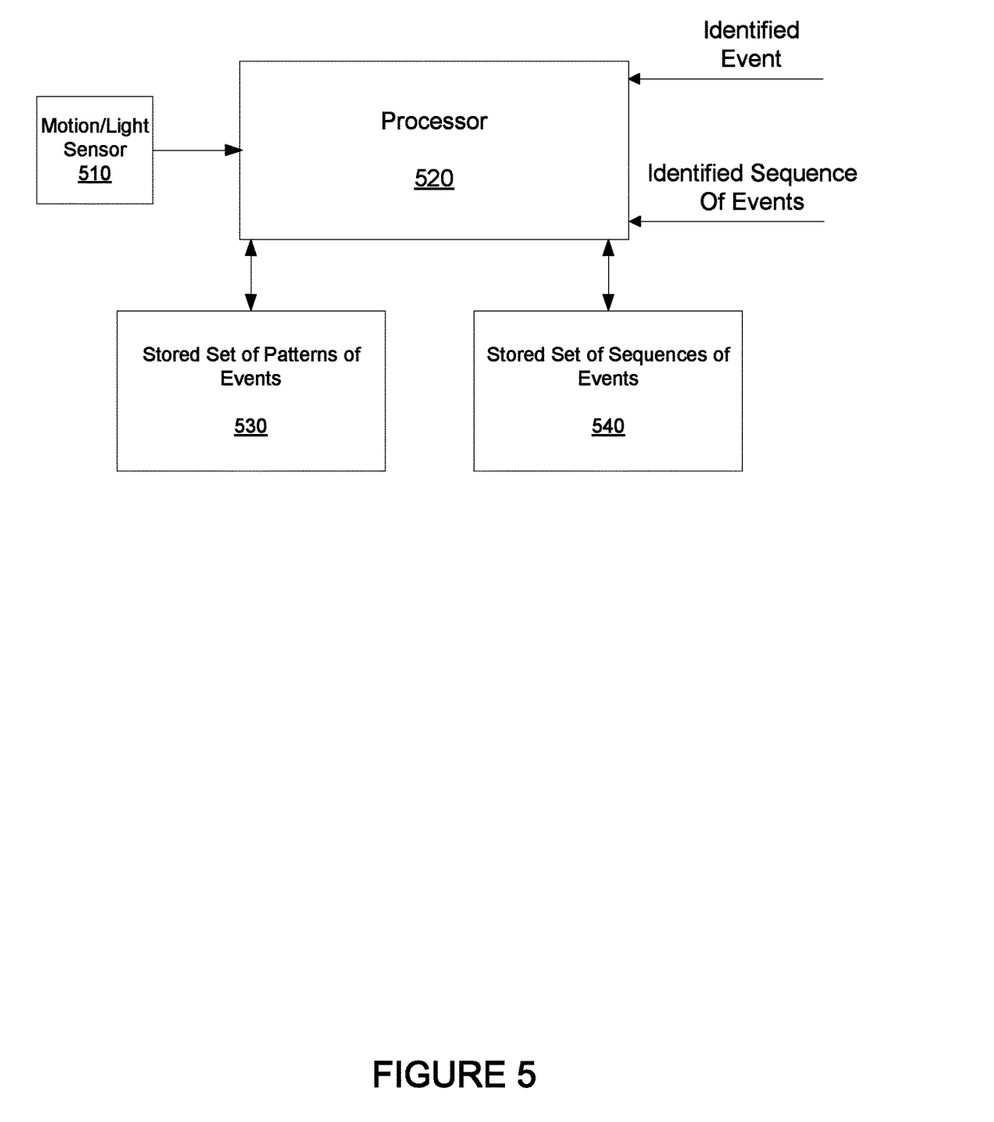
FIG. 5 shows a block diagram of event detector, according to an embodiment.

FIG. 5 shows a block diagram of event detector according to an embodiment. As shown, a motion/light sensor 510 senses motion within, for example, a structure. Various embodiments include different embodiments of motion sensors. For one embodiment, the motion sensor includes an infrared (IR) sensor. For another embodiment, the motion sensor includes an ambient light sensor. Other embodiments include ultrasonic motion sensors, dual tech (PIR/ultrasonic, PIR/microphonic, etc.) motion sensors, and camera/image based motion sensors.

A sensed signal of the motion/light sensor 510 is received by a processor 520. While shown generically as a single processor 520, for at least some embodiments, the processor 520 includes the smart sensor CPU 435, the manager CPU 420, or a combination of the smart sensor CPU 435 and the manager CPU 420. The processor 520 identifies an event by matching the sensed signal with a plurality of stored event patterns stored, for example, in a stored set of patterns of events database 530. For one embodiment, the sensed signal is sampled, and the processor 520 includes digital signal processing that matches set of samples of the stored event patterns. For another embodiment, the sensed signal is an analog signal and the processor 520 matches the analog signal with stored patterns of analog signals.

Exemplary patterns of events include, for example, an occupant entering a room, an incandescent lamp being turned on, direct unfiltered sunlight, an abrupt entry well within a perimeter of the structure (that is, for example, a break-in), a small animal (such as, a dog or a cat) running into the room or structure, rising steam from boiling water (for example, steam/heat from a burst heating/water pipe), fluctuations in near IR ambient light, entry of an automobile in a parking garage, a heating or air conditioning (AC) unit on, a portable space heater unit on, operation of a fire place, and/or a microwave or toaster oven on. Each of these events depicts a pattern that can be detected and identified through, for example, an IR sensor located in a structure (room) in which the event occurs. The detection of the event can be used to control lighting, temperature and/or security of the structure.

An embodiment of the processor 520 provides an indicator of an identified event (motion sensing). That is, once a match between the sensed signal and one of the stored patterns of event has been made, the processor 520 provides an indication of the match. Further, the processor can monitor the identified events over time, and match sequences of identified events with a stored set of sequences of events 540. That is another data base which includes stored sequences of events 540 which can provide for the identification of an activity that includes a predetermined sequence of events. An exemplary activity includes a person passing through the structure without stopping. That is, for example, the person walks through a room without stopping or staying in the room. Another exemplary activity includes the person entering the room, sitting and remaining near motionless. Both of these exemplary activities include a sequence of identifiable events.

Standard motion detectors sense motion and subsequently activate a light for a set period of time. If a person merely passes through a room with such a motion sensing and light combination, power is wasted lighting a room in which no one is present. If the person enters the room and remains near-motionless (that is, less motion than required to trigger the motion sensor) the light may turn off after the set period of time, which can be annoying to the person. The described embodiments eliminate these problems by specifically identifying events that occur, and reacting accordingly.

An embodiment includes a method of identifying an event, which is utilized as motion sensing for binding a mobile unit to a standalone sensor unit. A first step includes sensing motion with a light detector. A second step includes matching the sensed motion with one of a plurality of stored patterns of events. A third step includes identifying an event associated with the sensed motion based on a match between a one of the plurality of patterns and the sensed motion.

For at least some embodiments, the light sensor acts as a motion detector. The light detector can include, for example, an Infrared (IR) sensor, an ambient light sensor, or a heat sensor. Additionally, at least some embodiments further include matching a sequence of identified events. For one specific embodiment, the matched sequence of events provides identification of a user passing through a room that includes the light (motion) detector. For another specific embodiment, the matched sequence of events provides identification of a user entering a room that includes the light detector and then remaining near motionless. In conjunction with lighting, an embodiment further includes controlling a light associated with the light detector based at least in part on the identified event.

Figure 6:
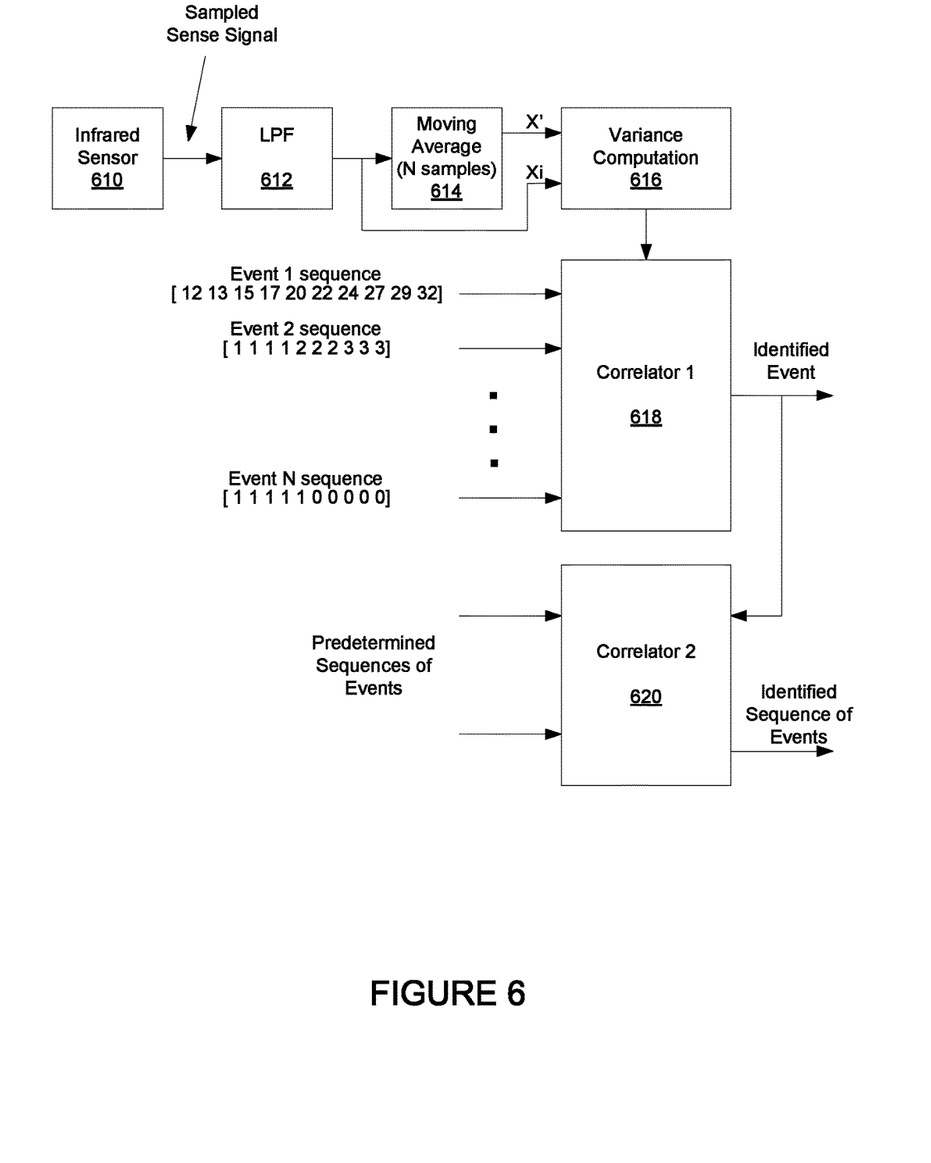
FIG. 6 shows a more detailed block diagram of an event detector, according to an embodiment.

FIG. 6 shows a more detailed block diagram of an event detector according to an embodiment. This embodiment includes an infrared (IR) sensor 610 that generates digital samples of a sensed IR signal. The sensed IR signal is filtered with a low pass filter (LPF) 612 to remove noise. The filtered signal is averaged over N samples (614). The number of samples N is selectable and adaptive, but an embodiment can advantageously select N to be a power of two to reduce processing complexity. A variance computation block 616 receives the averaged signal (X') and the instantaneous samples (Xi) and generates a variance signal. A correlator 618 matches the variance signal with a one of stored event sequences to provide identification of an event based upon the sensed signal of the IR sensor 610.

Embodiments include the stored event sequences being of length less than or equal to the number of samples N. Event sequences need not be of equal lengths. Prefixing, annexing, or inserting an event sequence with zeros effectively shortens or divides its sequence.

For at least some embodiments, the correlation is computed by comparing each instantaneous sample to its corresponding value in each of the stored event sequences for all N samples. If an instantaneous sample meets or exceeds its corresponding value of a stored event, a logical TRUE bit is set for that sample of that event. An event is detected when all N samples are TRUE, and the selected event is that of the highest priority.

A second correlator 620 can be included for matching sequences of identified events, thereby providing more information about activities occurring in the structure (for example, a room of a building).

If, for example, a person (occupant) is walking through a room (structure), a unique sequence of events is output from correlator 618 due to the IR sensor 610. This sequence of events is input to correlator 620 at a non-uniform rate as exemplified in table 1.

If one such predetermined sequence of events is defined as an alternating pattern of small lobe and large lobe events, correlator 620 outputs the identified sequence of events. Since there are numerous possible combinations and permutations of identified events output from correlator 618, the queue of length M of correlator 620 must be chosen to be of sufficient length to correlate with its predetermined sequences of events. A sample count, as exemplified in table 1, may be utilized to time-tag identified events and thereby identify those events that should be discarded.

TABLE 1

An Identified Sequence of Events Due to Walking Through a room

| VARIANCE | | | LOBE EVENT | | SAMPLE COUNT | | TIME | |
|---|---|---|---|---|---|---|---|---|
| t[0] | t[n − 1] | t[n − 2] | SMALL | LARGE | | Δ | (Sec) | Δ (mS) |
| 930 | 606 | 378 | X | | 16029 | | 0.000 | |
| 2999 | 2393 | 1808 | | X | 16033 | 4 | 0.063 | 63 |
| 224 | 410 | 669 | X | | 16051 | 18 | 0.348 | 284 |
| 809 | 729 | 644 | | X | 16063 | 12 | 0.537 | 190 |
| 308 | 402 | 524 | X | | 16070 | 7 | 0.648 | 111 |
| 595 | 514 | 422 | | X | 16077 | 7 | 0.758 | 111 |
| 340 | 404 | 497 | X | | 16083 | 6 | 0.853 | 95 |
| 2422 | 1723 | 1217 | | X | 16098 | 15 | 1.090 | 237 |
| 337 | 426 | 522 | X | | 16122 | 24 | 1.469 | 379 |
| 962 | 787 | 641 | | X | 16140 | 18 | 1.754 | 284 |
| 356 | 602 | 1023 | X | | 16179 | 39 | 2.370 | 616 |
| 514 | 508 | 482 | | X | 16186 | 7 | 2.480 | 111 |
| 327 | 411 | 453 | X | | 16189 | 3 | 2.528 | 47 |
| 1521 | 1250 | 976 | | X | 16212 | 23 | 2.891 | 363 |
| 350 | 683 | 1118 | X | | 16247 | 35 | 3.444 | 553 |
| 2180 | 1936 | 1563 | | X | 16256 | 9 | 3.586 | 142 |
| 297 | 501 | 785 | X | | 16275 | 19 | 3.886 | 300 |
| 1747 | 1410 | 1038 | | X | 16284 | 9 | 4.028 | 142 |
| 333 | 489 | 721 | X | | 16299 | 15 | 4.265 | 237 |
| 2170 | 1737 | 1293 | | X | 16311 | 12 | 4.455 | 190 |
| 243 | 408 | 648 | X | | 16340 | 29 | 4.913 | 458 |
| 642 | 597 | 507 | | X | 16351 | 11 | 5.087 | 174 |
| 307 | 378 | 440 | X | | 16361 | 10 | 5.245 | 158 |

Although specific embodiments have been described and illustrated, the described embodiments are not to be limited to the specific forms or arrangements of parts so described and illustrated. The embodiments are limited only by the appended claims.

What is claimed:
1. A standalone sensor unit, comprising:
a plurality of sensors, at least one of the plurality of sensors operative to sense light;
a controller operative to:
detect a presence of a mobile unit, wherein detecting the presence of the mobile unit comprises the controller being operative to;
sense a strobe of light by the at least one of the plurality of sensors; and
receive a configuration setting from the mobile unit within a window of time after presence of the mobile unit has been detected;
wherein the standalone sensor unit further comprises;
a long-wave radio operative to receive an atomic clock signal;
an atomic clock receiver operative to set a time of the standalone sensor unit based on the received atomic clock signal; wherein the controller is further operative to select a profile of the standalone sensor unit based on the time; and an ambient light sensor operative to sense ambient light; and wherein the controller is further operative to select a time zone based on timing of the sensed ambient light.

2. The standalone sensor unit of claim 1, wherein detecting the presence of the mobile unit further comprises the controller being operative to sense motion with a motion sensor, and sense the strobe of light, wherein the sensed motion and the sensed strobe of light occur within a predetermined time of each other.

3. The standalone sensor unit of claim 2, wherein sensing motion comprises sensing motion with a light detector, matching the sensed motion with one of a plurality of stored patterns of events, and identifying an event associated with the sensed motion based on a match between a one of the plurality of patterns and the sensed motion.

4. The standalone sensor unit of claim 1, wherein selecting the time zone comprises accessing a look up table based on the time and the timing of the sensed ambient light.

5. The standalone sensor unit of claim 1, wherein detecting the presence of the mobile unit binds the sensor unit to the mobile unit.

6. The standalone sensor unit of claim 5, wherein the bound mobile unit is operative as a remote switch or a wireless switch for controlling a light associated with the standalone sensor unit.

7. The standalone sensor unit of claim 1, wherein receiving the configuration setting comprises an operator of the mobile unit selecting the configuration setting from a plurality of predetermined configuration settings.

8. The sensor unit of claim 7, wherein at least one of the predetermined configuration settings enables the standalone sensor unit to connect to a network.

9. A method comprising:
detecting, by a standalone sensor unit, a presence of a mobile unit, comprising;
sensing strobe of light; and
receiving a configuration setting from the mobile unit within a window of time after presence of the mobile unit has been detected;
wherein the method further comprises;
receiving, by a long-wave radio of the standalone sensor unit, an atomic clock signal;
determining a time based on the received atomic clock signal;

selecting a profile of the standalone sensor unit based on the time;
sensing ambient light; and
selecting a time zone based on timing of the sensed ambient light.

10. The method of claim 9, wherein detecting the presence of the mobile unit further comprises sensing motion and sensing the strobe of light, wherein the sensed motion and the sensed strobe of light occur within a predetermined time of each other.

11. The method of claim 10, wherein sensing motion comprises sensing motion with a light detector, matching the sensed motion with one of a plurality of stored patterns of events, and identifying an event associated with the sensed motion based on a match between a one of the plurality of patterns and the sensed motion.

12. The method of claim 9, wherein selecting the time zone comprises accessing a look up table based on the time and the timing of the sensed ambient light.

13. The method of claim 9, wherein detecting the presence of the mobile unit binds the standalone sensor unit to the mobile unit.

14. The method of claim 13, wherein the bound mobile unit is operative as a remote switch or a wireless switch for controlling a light associated with the standalone sensor unit.

15. The method of claim 9, wherein receiving the configuration comprises an operator of the mobile unit selecting the configuration setting from a plurality of predetermined configuration settings.

16. A standalone sensor unit, comprising:
a long-wave radio operative to receive an atomic clock signal;
an atomic clock receiver operative to set a time based on the received atomic clock signal;
a controller operative to select a profile of the standalone sensor unit based on the time;
an ambient light sensor operative to sense ambient light; and
wherein the controller is further operative to select a time zone based on timing of the sensed ambient light.

17. The sensor unit of claim 16, wherein selecting the time zone comprises accessing a look up table based on the time and the timing of the sensed ambient light.

* * * * *